United States Patent
Matsutaka et al.

(10) Patent No.: US 10,700,763 B2
(45) Date of Patent: Jun. 30, 2020

(54) WIRELESS RELAY DEVICE, WIRELESS RELAY METHOD, AND COMPUTER READABLE MEDIUM

(71) Applicant: Mitsubishi Electric Corporation, Tokyo (JP)

(72) Inventors: Yasushi Matsutaka, Tokyo (JP); Kentaro Sawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/769,879

(22) PCT Filed: Dec. 18, 2015

(86) PCT No.: PCT/JP2015/085582
§ 371 (c)(1),
(2) Date: Apr. 20, 2018

(87) PCT Pub. No.: WO2017/104083
PCT Pub. Date: Jun. 22, 2017

(65) Prior Publication Data
US 2018/0309499 A1    Oct. 25, 2018

(51) Int. Cl.
*H04B 7/14* (2006.01)
*H04W 36/32* (2009.01)
(Continued)

(52) U.S. Cl.
CPC .......... *H04B 7/14* (2013.01); *H04W 36/0083* (2013.01); *H04W 36/165* (2013.01);
(Continued)

(58) Field of Classification Search
CPC . H04W 76/15; H04W 72/1215; H04W 16/14; H04W 36/16; H04W 36/165;
(Continued)

(56) References Cited

U.S. PATENT DOCUMENTS 6,272,346 B1   8/2001   Fujinami
6,587,689 B1   7/2003   Panasik
(Continued)

FOREIGN PATENT DOCUMENTS

CN   103209318 A   7/2013
CN   104584634 A   4/2015
(Continued)

OTHER PUBLICATIONS

German Office Action dated Jan. 23, 2019, for corresponding German Application No. 112015007132.6, with an English Translation.
(Continued)

*Primary Examiner* — Yemane Mesfin
*Assistant Examiner* — Intekhaab A Siddiquee
(74) *Attorney, Agent, or Firm* — Birch, Stewart, Kolasch & Birch, LLP.

(57) ABSTRACT

A reception unit receives from a wireless relay device, a handover response indicating possibility of degradation in communication quality during wireless communication with the wireless relay device. A search unit searches whether or not a wireless relay device to which handover can be performed is present other than the wireless relay device. When the wireless relay device to which handover can be performed other than the wireless relay device is present as a result of search by the search unit, a transmission unit transmits a handover request to the wireless relay device found by the search unit.

8 Claims, 8 Drawing Sheets

(51) Int. Cl.

| | | |
|---|---|---|
| *H04W 48/16* | (2009.01) | |
| *H04W 36/16* | (2009.01) | |
| *H04W 36/00* | (2009.01) | |
| *H04W 36/24* | (2009.01) | |
| *H04W 84/12* | (2009.01) | |
| *H04W 36/30* | (2009.01) | |

(52) U.S. Cl.
CPC ........... *H04W 36/32* (2013.01); *H04W 48/16* (2013.01); *H04W 36/245* (2013.01); *H04W 36/30* (2013.01); *H04W 84/12* (2013.01)

(58) Field of Classification Search
CPC . H04W 36/0083; H04W 36/30; H04W 48/16; H03M 13/2792; H04L 27/2656; H04B 7/14
USPC ......................................................... 370/329
See application file for complete search history.

(56) References Cited

U.S. PATENT DOCUMENTS

| | | | |
|---|---|---|---|
| 9,195,232 B1* | 11/2015 | Egnor | .................. G05D 1/0055 |
| 2006/0030323 A1 | 2/2006 | Ode et al. | |
| 2008/0026760 A1 | 1/2008 | Park et al. | |
| 2008/0102839 A1 | 5/2008 | Kurokawa | |
| 2009/0318156 A1 | 12/2009 | Ode et al. | |
| 2012/0275434 A1 | 11/2012 | Ode et al. | |
| 2013/0089075 A1 | 4/2013 | Lim | |
| 2013/0225173 A1 | 8/2013 | Lim et al. | |
| 2014/0003322 A1 | 1/2014 | Grinshpun et al. | |
| 2014/0274006 A1* | 9/2014 | Mutya | ................... H04W 36/14 455/416 |
| 2015/0223099 A1* | 8/2015 | Fujiwara | .......... G08B 13/19689 348/143 |

FOREIGN PATENT DOCUMENTS

| | | | |
|---|---|---|---|
| DE | 19741701 A1 | 3/1999 | |
| EP | 1077579 A1 | 2/2001 | |
| EP | 2 696 625 A1 | 2/2014 | |
| JP | 11-127100 A | 5/1999 | |
| JP | 2000-197090 A | 7/2000 | |
| JP | 2000197090 * | 7/2000 | ............... H04Q 7/22 |
| JP | 2000197090 A * | 7/2000 | ............... H04Q 7/22 |
| JP | 2008-35471 A | 2/2008 | |
| JP | 2008-113220 A | 5/2008 | |
| JP | 2014-90376 A | 5/2014 | |
| WO | WO 2004/112419 A1 | 12/2004 | |
| WO | WO 2012/137293 A1 | 10/2012 | |

OTHER PUBLICATIONS

International Search Report issued in PCT/JP2015/085582, dated Mar. 8, 2016.
Notification of Reasons for Refusal for Japanese Application No. 2016-534276, dated Sep. 20, 2016.
Office Action dated Apr. 13, 2020 in corresponding Chinese Application No. 201580085304.5.

* cited by examiner

WIRELESS RELAY DEVICE, WIRELESS RELAY METHOD, AND COMPUTER READABLE MEDIUM

TECHNICAL FIELD

The present invention relates to a wireless communication device and a wireless relay device.

BACKGROUND ART

Conventionally, a moving wireless communication device connects with a wireless relay device (a base station, an access point, or the like) with the best communication quality at initiation of connection, and starts communication with the connected wireless relay device. When the condition of communication with the wireless relay device with which the wireless communication device communicates gets worse, the wireless communication device performs handover to another neighboring wireless relay device, and starts communication with the new wireless relay device. When wireless communication between a wireless communication device and a wireless relay device is affected by an obstacle, the communication quality is degraded and handover needs to be performed again.

Patent Literature 1 discloses a method in which a moving object monitors whether or not an obstacle is present between the moving object and a base station in the moving direction of the moving object by using a monitoring camera or a sensor. In addition, when an obstacle is detected, the moving object of Patent Literature 1 recognizes the position at which communication with the base station will be disconnected, and maintains the communication by changing the communication method such as changing a communication speed or a modulation method.

In addition, Patent Literature 2 discloses a manhole type base station. Patent Literature 2 also discloses a method of mounting a pressure sensor or an electric wave sensor on a manhole to allow the base station to detect whether or not an obstacle is present on the manhole, and when an obstacle is detected, causing a child device performing communication to perform handover to another base station to maintain the communication.

CITATION LIST

Patent Literature

Patent Literature 1: JP 2014-90376 A
Patent Literature 2: JP H11-127100 A

SUMMARY OF INVENTION

Technical Problem

As mentioned above, Patent Literature 1 describes that a moving object detects an obstacle between the moving object and a base station with which the moving object communicates, and changes the communication method to maintain the communication. Even when the communication method is changed, however, there is still the possibility of disconnection of communication with the base station, and there is no guarantee that the moving object can maintain the communication.

In addition, Patent Literature 2 discloses a method in which a manhole type base station detects an obstacle present on the base station, and causes a child device performing communication to perform handover to another base station to maintain the communication. The presence of an obstacle on a manhole and the period during which the obstacle is present are, however, irregular, and the communication quality may be degraded and the communication with a child device may be disconnected before handover is completed. Furthermore, the period during which communication is enabled may be short due to traffic or the like, and there is a possibility that the base station cannot function sufficiently.

Thus, the technology of Patent Literature 1 and the technology of Patent Literature 2 have a problem that a wireless communication device cannot obtain good communication quality when wireless communication between the wireless communication device and a wireless relay device is affected by an obstacle. The present invention realizes a configuration allowing a wireless communication device to obtain better communication quality even when wireless communication between the wireless communication device and a wireless relay device is affected by an obstacle.

Solution to Problem

A wireless communication device according to the present invention includes:
  a reception unit to receive from a wireless relay device, a handover response indicating possibility of degradation in communication quality during wireless communication with the wireless relay device;
  a search unit to search whether or not a wireless relay device to which handover can be performed is present other than the wireless relay device; and
  a transmission unit to transmit a handover request, when a wireless relay device to which handover can be performed is present other than the wireless relay device as a result of search by the search unit, to the wireless relay device found by the search unit.

Advantageous Effects of Invention

In the present invention, a wireless communication device searches whether or not a wireless relay device to which handover can be performed is present other than the wireless relay device that has transmitted a handover response, and when a wireless relay device to which handover can be performed is present as a result of the search, transmits a handover request to the found wireless relay device. According to the present invention, the wireless communication device therefore performs wireless communication with the found wireless relay device with better communication quality even when wireless communication with the wireless relay device that has transmitted the handover response is affected by an obstacle.

DESCRIPTION OF EMBODIMENTS

First Embodiment

Description of Configuration

Figure 1:
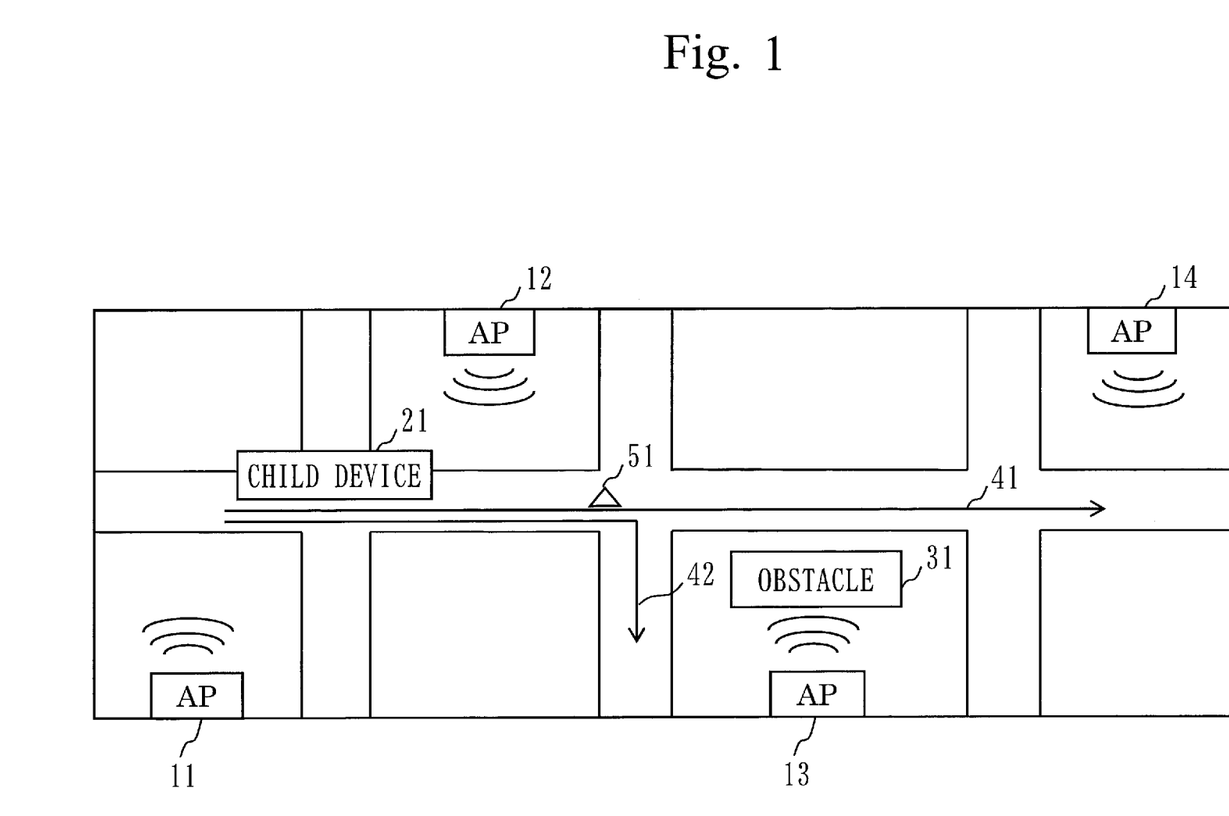
FIG. 1 is a diagram illustrating example arrangement of access points and an example moving route of a child device according to a first embodiment.

FIG. 1 illustrates an example of arrangement of access points and an example of moving route of a child device according to a first embodiment.

FIG. 1 illustrates a layout in a factory, for example.

Access points 11 to 14 are access points of a wireless local area network (LAN).

The access points 11 to 14 will hereinafter also be referred to as APs.

The access points 11 to 14 correspond to examples of wireless relay devices.

A child device 21 is a child device of the wireless LAN.

The child device 21 is mounted on an automatic cruising device, which is not illustrated.

The automatic cruising device automatically travels on passages in a factory to convey components and collect data such as delivery statuses of components and the numbers of remaining components at points through which the automatic cruise device passes, for example.

The child device 21 transmits the data collected by the automatic cruising device to a center device, which is not illustrated, via the APs 11 to 14.

Strictly speaking, the automatic cruising device on which the child device 21 is mounted moves in the factory; for convenience of description, however, the child device 21 will be expressed as moving in the description below.

The child device 21 corresponds to an example of a wireless communication device.

A moving route 41 and a moving route 42 are routes along which the child device 21 moves in the factory.

An obstacle 31 affects the communication quality of wireless communication between the child device 21 and the AP 13.

A point 51 is a point at which the child device 21 tries handover to another AP due to degradation of the communication quality during communication with the AP 12 while the child device 21 is moving on the moving route 41 or the moving route 42.

While an example in which the child device 21 and the APs 11 to 14 are used in a factory is described in the present embodiment, the use of the child device 21 and the APs 11 to 14 is not limited to inside of a factory.

Furthermore, while wireless communication via a wireless LAN is described as an example of wireless communication in the present embodiment, the following description is also applicable to wireless communication other than that via a wireless LAN.

Figure 2:
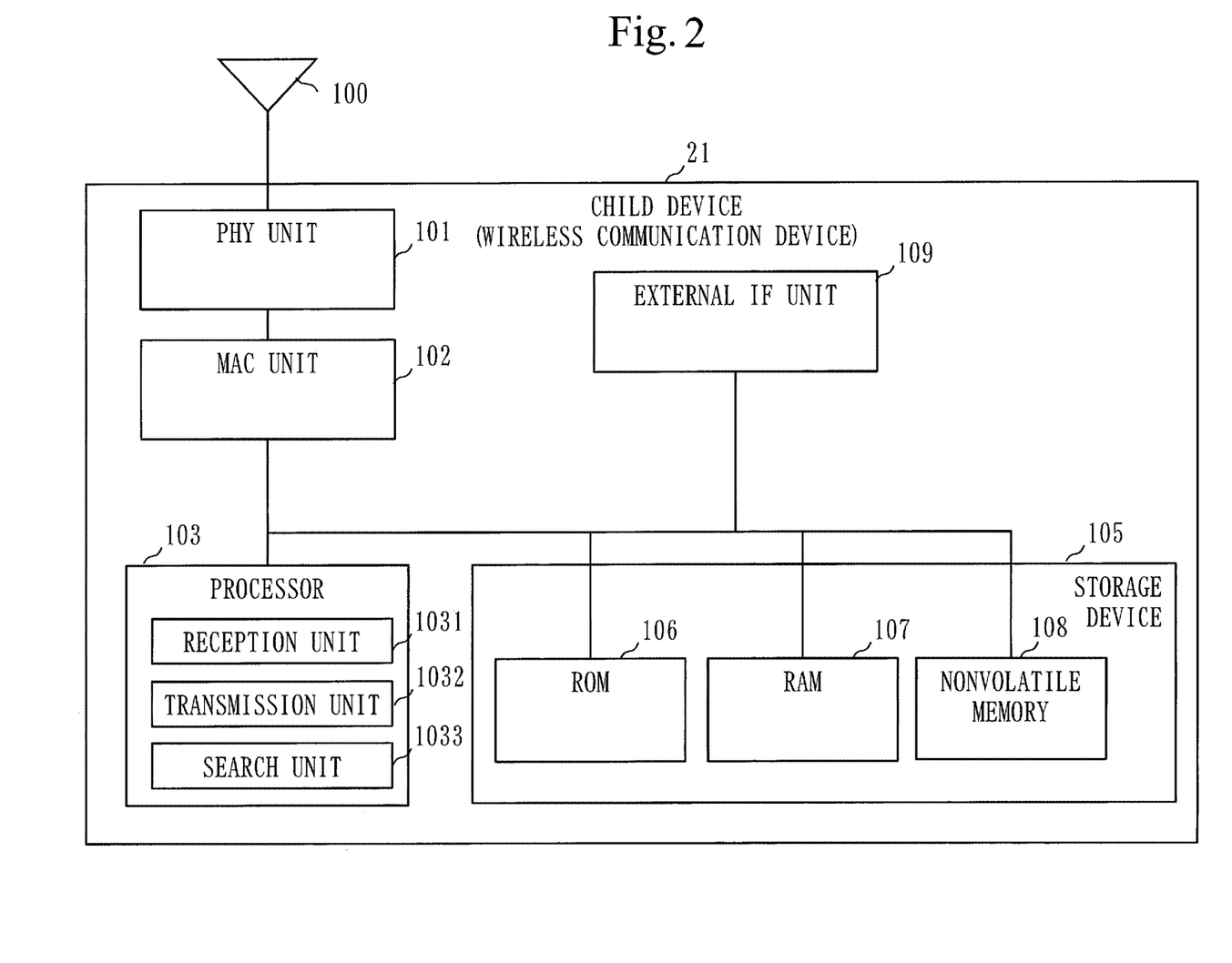
FIG. 2 is a diagram illustrating an example configuration of the child device according to the first embodiment.

FIG. 2 illustrates an example configuration of the child device 21 according to the first embodiment.

The child device 21 is a computer. As illustrated in FIG. 2, the child device 21 includes, as hardware, an antenna 100, a physical (PHY) unit 101, a media access control (MAC) unit 102, a processor 103, a storage device 105, and an external interface (IF) unit 109.

The child device 21 also includes, as a functional configuration, a reception unit 1031, a transmission unit 1032, and a search unit 1033.

The reception unit 1031, the transmission unit 1032, and the search unit 1033 are programs executed by the processor 103.

The programs for realizing the functions of the reception unit 1031, the transmission unit 1032, and the search unit 1033 are stored in the storage device 105, and the processor 103 executes these programs to perform operation of the reception unit 1031, the transmission unit 1032, and the search unit 1033, which will be described later.

FIG. 2 schematically illustrates a state in which the processor 103 executes the programs for realizing the functions of the reception unit 1031, the transmission unit 1032, and the search unit 1033.

The storage device 105 is constituted by a read only memory (ROM) 106, a random access memory (RAM) 107, and a nonvolatile memory 108.

Hereinafter, the respective components illustrated in FIG. 2 will be described.

The antenna 100 transmits and receives data to and from the APs 11 to 14.

The PHY unit 101 is an interface for communication with the APs 11 to 14 via the antenna 100.

The PHY unit 101 has functions of a physical layer in the Open Systems Interconnection (OSI) reference model, and performs demodulation process of received data, modulation process of data to be transmitted, and the like.

The PHY unit 101 also measures the communication quality of communication paths to/from the APs 11 to 14.

The PHY unit 101 informs the search unit 1033 of the processor 103, of the result of measurement of the communication quality of the communication paths, via the MAC unit 102.

The PHY unit 101 is constituted by an interface card for wireless communication, for example.

The MAC unit 102 has a function of controlling the PHY unit 101, and manages MAC addresses.

The MAC unit 102 has functions of a data link layer in the OSI reference model, removes an MAC header and the like from data received from the PHY unit 101, and adds an MAC header and the like to data to be passed to the PHY unit 101.

The MAC unit 102 is constituted by a driver circuit, for example.

The processor 103 is an integrated circuit (IC) to perform processing.

The processor 103 is a central processing unit (CPU), a digital signal processor (DSP), or the like.

The processor 103 has functions of a network layer or a higher layer than the network layer in the OSI reference model, reads programs saved in the ROM 106, and performs various processes as the child device 21 such as acquisition, transmission, transfer, and the like of data.

The processor 103 performs communication process with the automatic cruising device via the external IF unit 109, and acquires data from the automatic cruising device. The processor 103 stores the acquired data into one or both of the RAM 107 and the nonvolatile memory 108 of the storage device 105. The processor 103 is constituted by a processing circuit to execute protocols of a network layer or a higher layer, for example.

The reception unit 1031 receives data transmitted from the APs 11 to 14 via the PHY unit 101 and the MAC unit 102.

The reception unit 1031 receives control information for the automatic cruising device transmitted from the center device, for example.

The reception unit 1031 also receives a handover response from an AP.

Note that the operation performed by the reception unit 1031 corresponds to a reception process.

The transmission unit 1032 transmits data to the APs 11 to 14 via the PHY unit 101 and the MAC unit 102.

The transmission unit 1032 transmits data received from the automatic cruising device to the APs 11 to 14, for example.

The transmission unit 1032 transmits a handover request to an AP. A handover request indicates a current position and a moving route of the child device 21.

Note that the operation performed by the transmission unit 1032 corresponds to a transmission process.

The search unit 1033 controls the measurement of the communication quality of the communication paths performed by the PHY unit 101.

The search unit 1033 also acquires the result of measurement of the communication quality of the communication paths measured by the PHY unit 101 via the MAC unit 102, and searches whether or not an AP to which handover can be performed is present.

The search unit 1033 also stores the acquired result of measurement of the communication quality of the communication paths into one or both of the RAM 107 and the nonvolatile memory 108 of the storage device 105.

The search unit 1033 may further perform communication with the automatic cruising device via the external IF unit 109, and store data from the automatic cruising device into the storage device 105.

Note that the operation performed by the search unit 1033 corresponds to a search process.

The storage device 105 stores various information data such as programs and acquired data. The storage device 105 is constituted by memories.

The ROM 106 stores programs to be executed by the processor 103.

More specifically, the ROM 106 stores programs for realizing the reception unit 1031, the transmission unit 1032, and the search unit 1033.

The ROM 106 also stores an operating system (OS).

The RAM 107 temporarily saves information such as results of measurement of the communication quality, data collected by the automatic cruising device, and the moving routes of the automatic cruising device.

In addition, the programs for realizing the reception unit 1031, the transmission unit 1032, and the search unit 1033 are loaded into the RAM 107.

Furthermore, at least part of the OS is also loaded into the RAM 107.

The nonvolatile memory 108 temporarily saves information such as results of measurement of the communication quality, data collected by the automatic cruising device, and the moving routes of the automatic cruising device.

While the nonvolatile memory 108 and the RAM 107 save the same information in the present embodiment, the nonvolatile memory 108 and the RAM 107 may hold different information from each other.

The external IF unit 109 is an interface to the automatic cruising device.

The external IF unit 109 acquires data collected by the automatic cruising device.

The external IF unit 109 also transfers control information for the automatic cruising device transmitted from the center device to the automatic cruising device.

The external IF unit 109 is constituted by an interface card for wireless communication or wired communication, for example.

Figure 3:
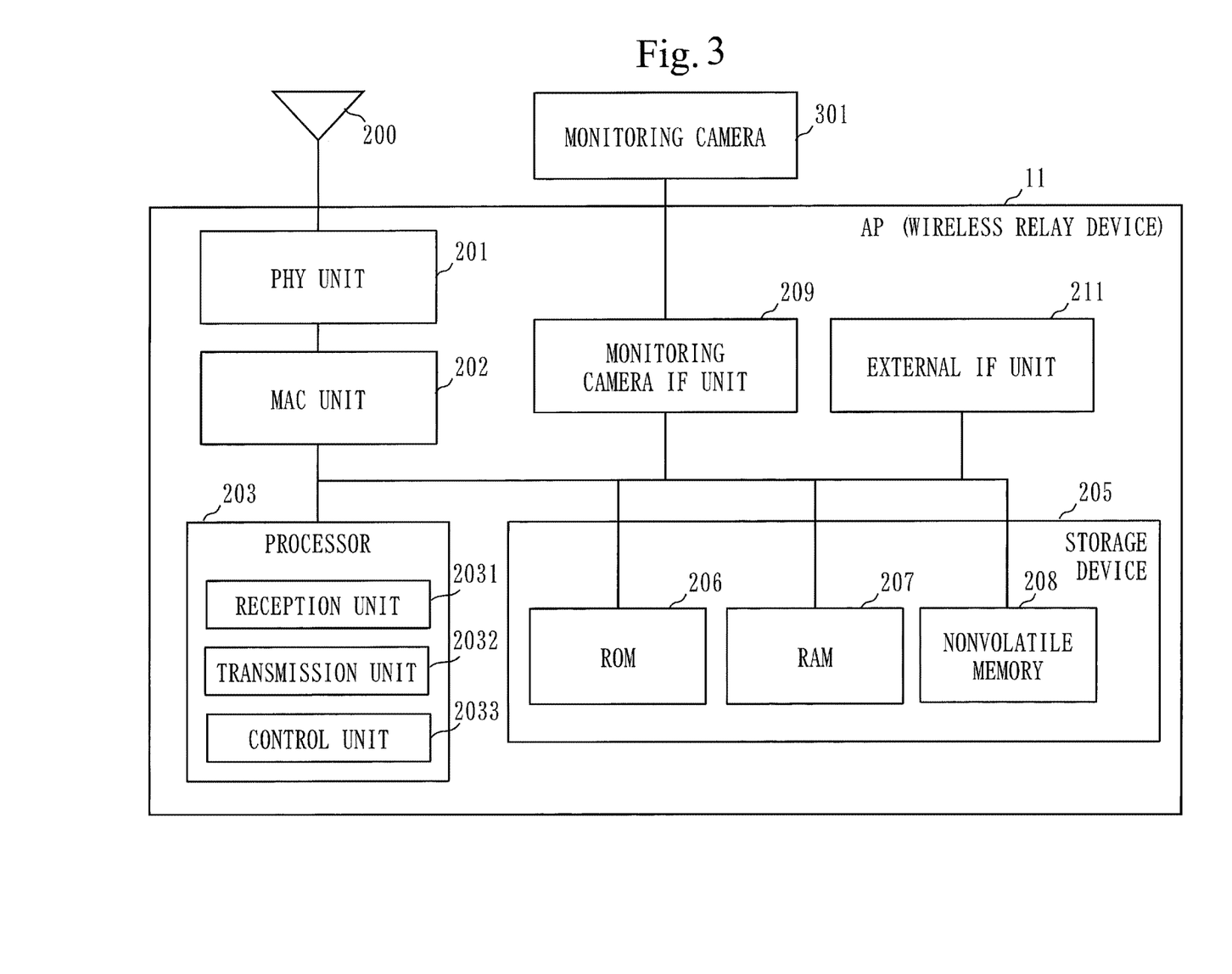
FIG. 3 is a diagram illustrating an example configuration of the access point according to the first embodiment.

FIG. 3 illustrates an example configuration of the AP 11 according to the first embodiment. While the example configuration of the AP 11 is illustrated in FIG. 3, the APs 12 to 14 also have the same configuration as that of the AP 11.

The AP 11 is a computer. As illustrated in FIG. 3, the AP 11 includes, as hardware, an antenna 200, a PHY unit 201, an MAC unit 202, a processor 203, a storage device 205, a monitoring camera IF unit 209, and an external IF unit 211.

The AP 11 also includes, as a functional configuration, a reception unit 2031, a transmission unit 2032, and a control unit 2033.

The reception unit 2031, the transmission unit 2032, and the control unit 2033 are programs executed by the processor 203.

The programs for realizing the functions of the reception unit 2031, the transmission unit 2032, and the control unit 2033 are stored in the storage device 205, and the processor 203 executes these programs to perform operation of the reception unit 2031, the transmission unit 2032, and the control unit 2033, which will be described later.

FIG. 3 schematically illustrates a state in which the processor 203 executes the programs for realizing the functions of the reception unit 2031, the transmission unit 2032, and the control unit 2033.

The storage device 205 is constituted by a ROM 206, a RAM 207, and a nonvolatile memory 208.

The antenna 200, the PHY unit 201, and the MAC unit 202 are similar to the antenna 100, the PHY unit 101, and the MAC unit 102, respectively, of the child device 21, and the description thereof will thus be omitted.

The processor 203 is an IC to perform processing.

The processor 203 is a CPU, a DSP, or the like.

The processor 203 has functions of a network layer or a higher layer than the network layer in the OSI reference model, reads programs saved in the ROM 206, and performs various processes as the AP 11 such as transfer of data.

The processor 203 is constituted by a processing circuit to execute protocols of a network layer or a higher layer, for example.

The reception unit 2031 receives data transmitted from the child device 21 via the PHY unit 201 and the MAC unit 202.

The reception unit 2031 receives data from the automatic cruising device transmitted from the child device 21, for example.

The reception unit 2031 also receives a handover request from the child device 21.

As described above, a handover request indicates a current position and a moving route of the child device 21.

Note that the operation performed by the reception unit 2031 corresponds to a reception process.

The transmission unit 2032 transmits data to the child device 21 via the PHY unit 201 and the MAC unit 202.

The transmission unit 2032 transmits control information for the automatic cruising device transmitted from the center device to the child device 21, for example.

The transmission unit 2032 also transmits a handover response to the child device 21.

Note that the operation performed by the transmission unit 2032 corresponds to a transmission process.

The control unit 2033 analyzes a captured image obtained by capturing the surroundings of the AP 11 on the basis of the current position and the moving route of the child device 21 indicated by the handover request, and determines whether or not an obstacle affecting the communication quality of wireless communication with the child device 21 moving along the moving route is present.

Specifically, the control unit 2033 compares a captured image from a monitoring camera 301 acquired by the monitoring camera IF unit 209, which will be described later, with a captured image of the surroundings of the AP 11 in a steady state stored in the nonvolatile memory 208 to check whether or not an obstacle is present around the AP 11, that is, in a communication area of the AP 11. If an obstacle is present in the communication area of the AP 11, the control unit 2033 then determines whether or not the communication quality of wireless communication with the child device 21 is affected by the obstacle, that is, whether or not the communication quality of wireless communication with the child device 21 is degraded by the obstacle on the basis of the current position and the moving route of the child device 21.

The control unit 2033 also acquires a result of measurement of the communication quality of the communication paths measured by the PHY unit 201 via the MAC unit 202, and stores the acquired result of measurement of the communication quality of the communication paths into one or both of the RAM 207 and the nonvolatile memory 208 of the storage device 205.

Note that the operation performed by the control unit 2033 corresponds to a control process.

The storage device 205 stores various information data such as programs. The storage device 205 is constituted by memories.

The ROM 206 stores programs to be executed by the processor 203.

More specifically, the ROM 206 stores programs for realizing the reception unit 2031, the transmission unit 2032, and the control unit 2033.

The ROM 206 also stores the OS.

The RAM 207 temporarily saves information such as results of measurement of the communication quality, and data acquired from the child device 21.

In addition, the programs for realizing the reception unit 2031, the transmission unit 2032, and the control unit 2033 are loaded into the RAM 207.

Furthermore, at least part of the OS is also loaded into the RAM 207.

The nonvolatile memory 208 temporarily saves information such as results of measurement of the communication quality, and data acquired from the child device 21.

While the nonvolatile memory 208 and the RAM 207 save the same information in the present embodiment, the nonvolatile memory 208 and the RAM 207 may hold different information from each other.

In addition, the nonvolatile memory 208 saves the captured image of the surroundings of the AP 11 in the steady state.

The monitoring camera IF unit 209 is an interface to the monitoring camera 301 provided outside of the AP 11.

The monitoring camera IF unit 209 acquires a captured image from the monitoring camera 301.

The monitoring camera 301 monitors conditions in the communication area of the AP 11. Specifically, the monitoring camera 301 captures the surroundings of the AP 11, and transmits a captured image to the monitoring camera IF unit 209.

Note that the captured image transmitted from the monitoring camera 301 may be a static image or a moving image.

The external IF unit 211 is an interface to transmit and receive data to and from the center device.

The external IF unit 211 transmits data transmitted from the automatic cruising device connected with the external IF unit 109 of the child device 21 to the center device. The external IF unit 211 also receives data such as the moving route of the automatic cruising device, from the center device.

Description of Operation

Next, an outline of the operation of the child device 21 and the AP 11 according to the present embodiment will be described with reference to FIG. 1.

As illustrated in FIG. 1, assume that the child device 21 travels along the moving route 41 while communicating with the center device by using a wireless LAN. The child device 21 first travels while communicating with the AP 11, but degradation in the communication quality occurs while traveling. Then the child device 21 performs handover to the AP 12 to continue communication with the center device.

Assume that the communication quality of communication with the AP 12 degrades thereafter near the point 51 in the factory. The child device 21 searches for a neighboring AP, and attempts to perform handover to the AP 13 to continue communication with the center device since the AP 13 is the nearest with better communication quality than those of other APs 11 and 14 at this point.

In the case of the moving route 41, however, the communication quality of wireless communication with the AP 13 may be degraded by an obstacle 31 a short time later. Specifically, the communication between the child device 21 and the AP 13 may be disconnected or may rapidly be degraded in communication quality by the obstacle 31. The child device 21 will therefore need to perform handover again in a short time after handover to the AP 13.

In contrast, in a case where the child device 21 is traveling along the moving route 42, the child device 21 will not be affected by the obstacle 31 after switching the relay from the AP 12 to the AP 13. The communication with the AP 13 can thus be continued stably.

As described above, the AP 13 is the optimum handover destination at the point 51 where the necessity of handover is detected, but the AP 13 is not the optimum handover destination in the case where the child device 21 moves along the moving route 41. In contrast, the AP 13 is the optimum handover destination in the case where the child device 21 moves along the moving route 42.

Operation for allowing the child device 21 to perform handover to an optimum handover destination will be described with reference to FIGS. 4 and 5.

Figure 4:
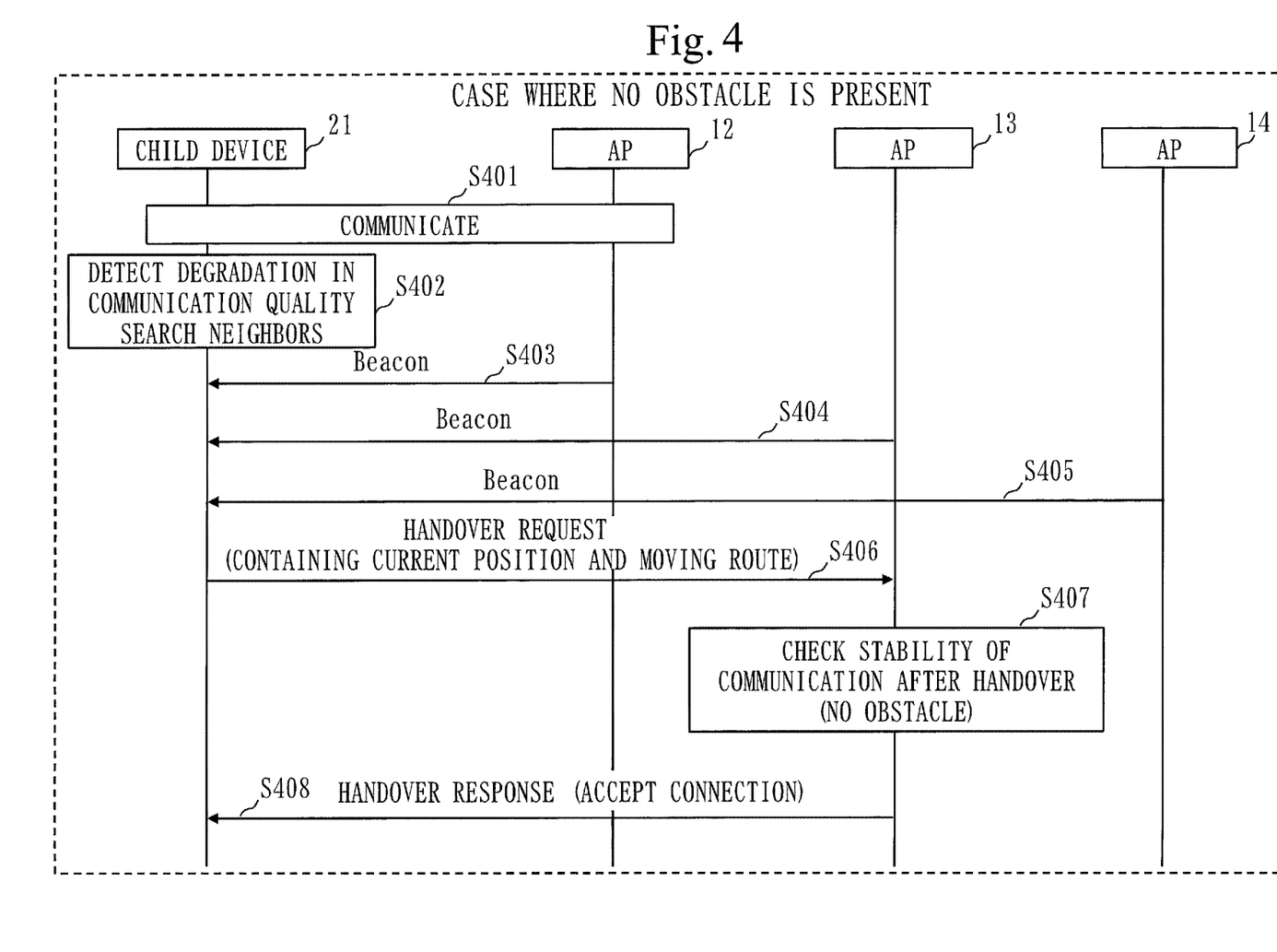
FIG. 4 is a diagram illustrating an example communication sequence (in a case where no obstacle is present) according to the first embodiment.
Figure 5:
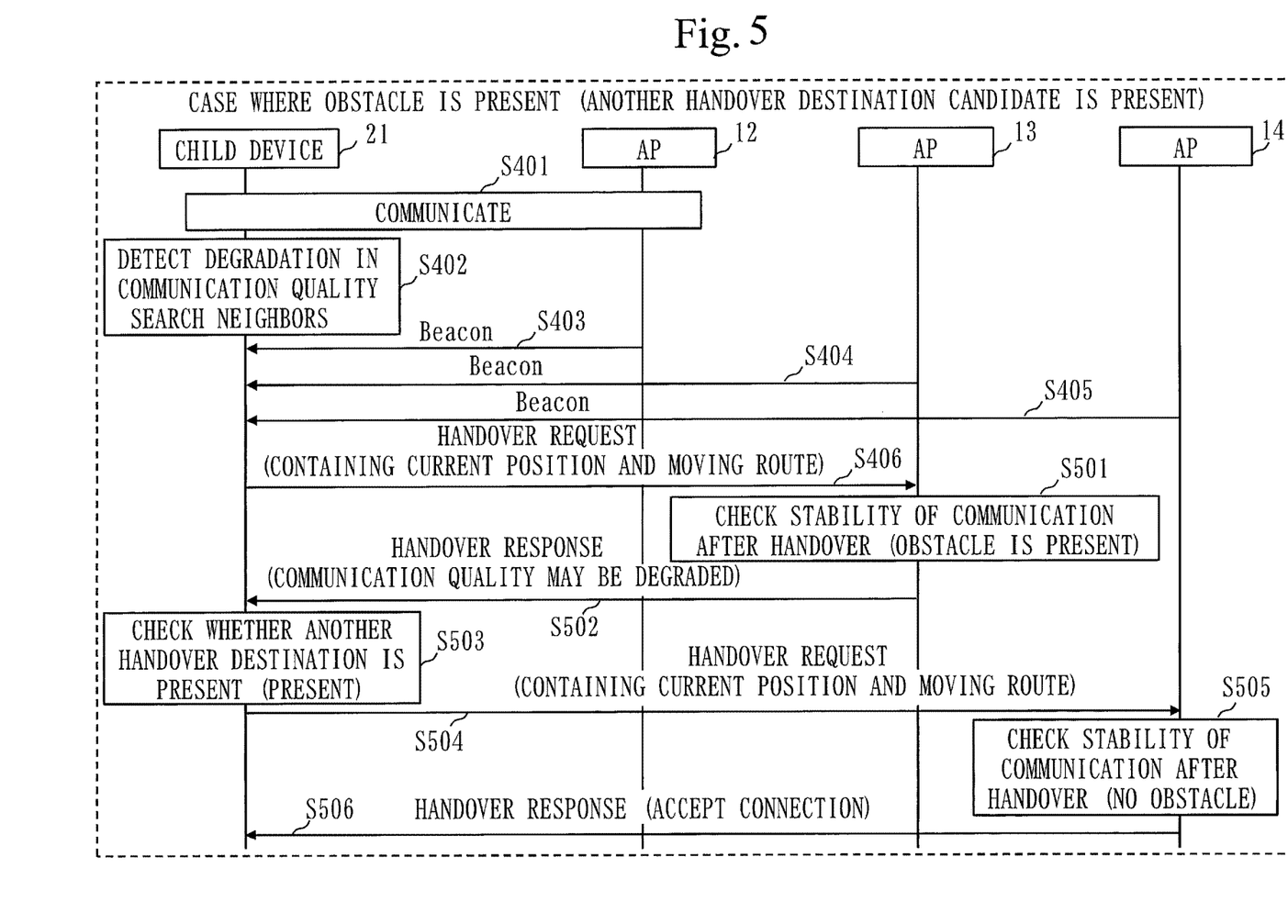
FIG. 5 is a diagram illustrating an example communication sequence (in a case where an obstacle is present (another handover destination candidate is present)) according to the first embodiment.

FIGS. 4 and 5 illustrate examples of a communication sequence between the child device 21 and the APs 12, 13, and 14.

FIG. 4 illustrates an example of the communication sequence in a case where no obstacle is present.

The APs periodically transmit beacons to show their presence to the child device as in FIG. 4.

When the communication quality degrades during wireless communication with the AP 12 (step S401), the child device 21 recognizes the need for handover, and confirms the presence of neighboring APs by receiving beacon frames (steps S402 to S405).

Since the AP with the best communication quality is the AP 13 at this point, the child device 21 transmits a handover request containing information of the current position and the moving route of the child device 21 to the AP 13 (step S406). For easier explanation, it is assumed that the child device 21 transmits a handover request independent of data for the center device in the present embodiment. The child device 21, however, may request handover by containing the information of the current position and the moving route in data for the center device.

Note that the moving route 42 of FIG. 1 is assumed to be indicated by the handover request in FIG. 4.

The AP 13 in receipt of the handover request compares a captured image from the monitoring camera 301 with the captured image of the inside of the factory in the steady state stored in the nonvolatile memory 208, and determines whether or not an obstacle that degrades the communication quality of wireless communication with the child device 21 moving along a moving route is present (step S407).

In the case of the moving route 42, the obstacle 31 illustrated in FIG. 1 does not affect the communication quality even after handover. Thus, the AP 13 transmits a handover response to accept connection with the child device 21 in response to the handover request (step S408).

FIG. 5 illustrates an example of the communication sequence in a case where an obstacle is present.

S401 to S406 in FIG. 5 are the same as those illustrated in FIG. 4. In FIG. 5, however, the moving route 41 of FIG. 1 is indicated by the handover request.

The AP 13 compares a captured image from the monitoring camera 301 with the captured image of the inside of the factory in the steady state stored in the nonvolatile memory 208, and determines whether or not an obstacle that degrades the communication quality of wireless communication with the child device 21 moving along a moving route is present (step S501).

In the case of the moving route 41, since the obstacle 31 illustrated in FIG. 1 may affect the communication quality after handover, the AP 13 transmits a handover response indicating the possibility of degradation in the communication quality during wireless communication in response to the handover request (step S502).

The child device 21 in receipt of the handover response checks whether or not an AP to be a handover destination other than the AP 13 is present on the basis of received beacons (step S503).

The child device 21 extracts the AP 14 as a next candidate for handover, and transmits a handover request to the AP 14 (step S504). The handover request transmitted in step S504 also contains information on the current position and the moving route of the child device 21.

The AP 14 in receipt of the handover request compares a captured image from the monitoring camera 301 with the captured image of the inside of the factory in the steady state stored in the nonvolatile memory 208, and determines whether or not an obstacle that degrades the communication quality of wireless communication with the child device 21 moving along a moving route is present (step S505).

The AP 14 confirms that no obstacle that affects the communication quality after handover is present. In addition, the AP 14 determines that the communication quality is getting better since the child device 21 approaches the AP 14.

As a result, the AP 14 transmits a handover response to accept connection with the child device 21 in response to the handover request (step S506).

As described above, in the present embodiment, an AP determines whether or not an obstacle that affects the communication quality of wireless communication is present by using the information on the moving route of the child device 21 and the captured image from the monitoring camera 301 to determine whether or not to accept handover.

This avoids unstable communication conditions such as disconnection of communication due to rapid degradation in the communication quality after handover or handover being necessary again in a short time after handover, and ensures stable communication.

FIG. 5 illustrates an example in which the AP 14 is present as another handover destination when the child device 21 is informed of the possibility of degradation in the communication quality by the handover response from the AP 13.

Figure 6:
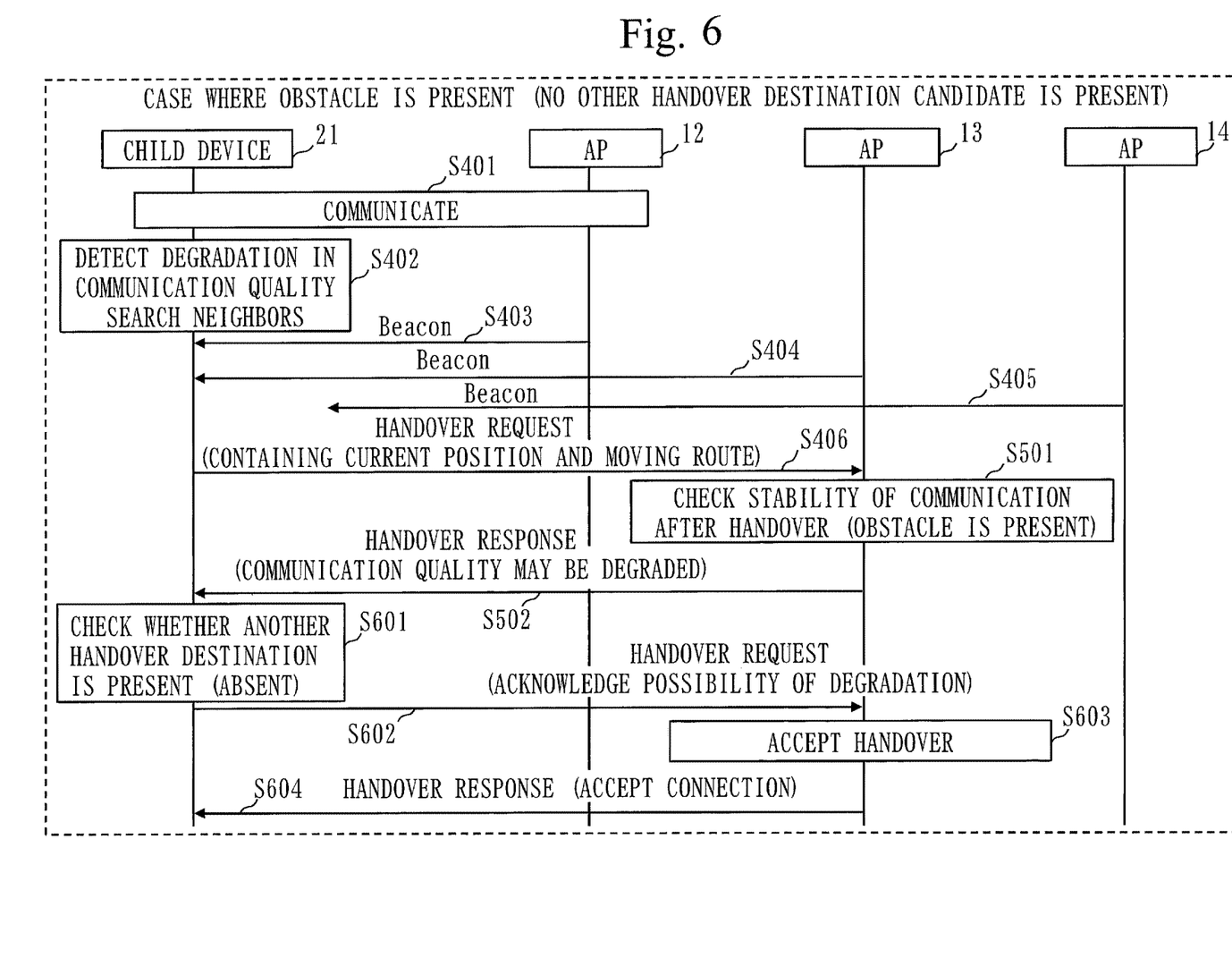
FIG. 6 is a diagram illustrating an example communication sequence (in a case where an obstacle is present (no handover destination candidate is present)) according to the first embodiment.

FIG. 6 illustrates an example communication sequence in a case where no other handover destination is present.

In the example of FIG. 6, the child device 21 can receive beacons from the AP 12 and the AP 13, but cannot receive beacons from the AP 14. When the child device 21 is informed of the possibility of degradation in the communication quality by the handover response from the AP 13 (step S502), the child device 21 checks another handover destination (step S601).

In this case, the AP 11 (not illustrated in FIG. 6) is present as another handover destination candidate, but the child device 21 does not select the AP 11 as a handover destination candidate since the communication with the AP 11 tends to be getting degraded.

The child device 21 transmits a handover request indicating that the child device 21 acknowledges the possibility of degradation in the communication quality to the AP 13 that has transmitted the handover response indicating the possibility of degradation in the communication quality (step S602). Note that this handover request is also referred to as an acknowledgment indicating message.

The AP 13 in receipt of the handover request recognizes that no other handover destination is present for the child device 21 (step S603), and transmits a handover response to accept connection with the child device 21 in response to the handover request (step S604). Note that this handover response is also referred to as an acceptance indicating message.

As described above, when no other handover destination is present for the child device 21, the AP 13 accepts the handover request and connects with the child device 21 even when communication may be disconnected.

Next, example operation of the child device 21 according to the present embodiment will be described with reference to FIG. 7.

Figure 7:
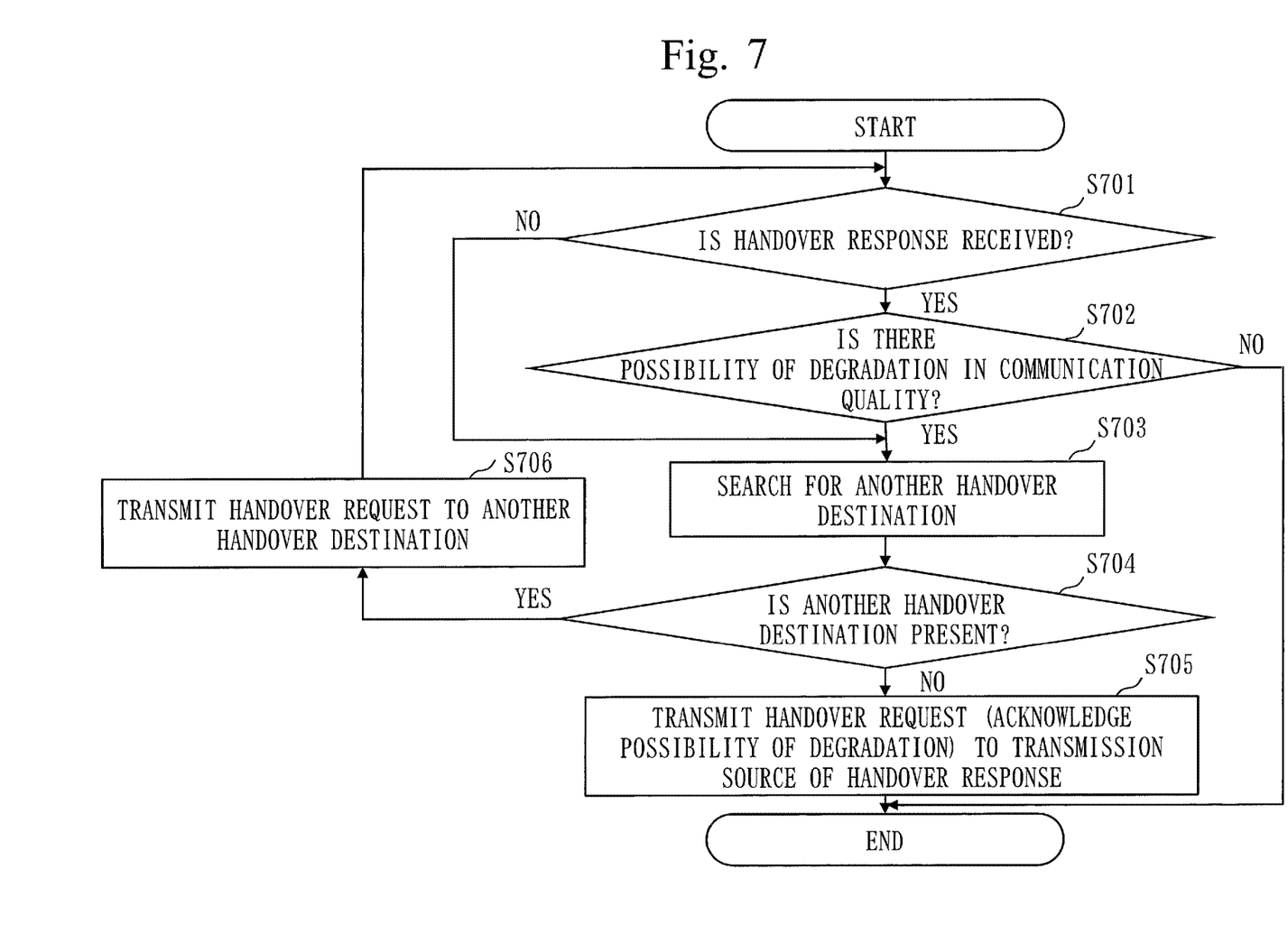
FIG. 7 is a flowchart illustrating example operation of the child device according to the first embodiment.

In FIG. 7, operation procedures of the child device 21 after transmission of a handover request (S406 in FIGS. 4 to 6) are illustrated.

Note that the operation procedures illustrated in FIG. 7 correspond to an example of a wireless communication method and a wireless communication program.

When the reception unit 1031 has received a handover response (YES in step S701), the reception unit 1031 outputs the received handover response to the search unit 1033.

The search unit 1033 checks whether or not the handover response indicates the possibility of degradation in the communication quality during wireless communication with the AP (step S702).

If the possibility of degradation in the communication quality is not indicated by the handover response (NO in step S702), the search unit 1033 terminates the processing.

In contrast, if the possibility of degradation in the communication quality is indicated by the handover response (YES in step S702), the search unit 1033 searches whether or not an AP to which handover can be performed is present other than the AP that has transmitted the handover response (step S703).

More specifically, the search unit 1033 acquires a result of measurement of the communication quality of the communication paths measured by the PHY unit 101 via the MAC unit 102. The search unit 1033 then determines whether or not an AP with the communication quality being not lower than a threshold is present, and extracts an AP with the best communication quality as another handover destination if a plurality of APs with the communication quality being not lower than the threshold are present.

If another handover destination is present as a result of the search in step S703 (YES in step S704), the search unit 1033 generates a handover request for the AP that is the other handover destination that is found, and the transmission unit 1032 transmits the handover request to the AP that is the other handover destination (step S706). The handover request transmitted in step S706 also contains information on the current position and the moving route of the child device 21.

In contrast, if no other handover destination is present (NO in step S704), the search unit 1033 generates an acknowledgment indicating message, that is, a handover request indicating that the child device 21 acknowledges the possibility of degradation in the communication quality, and the transmission unit 1032 transmits the handover request to the AP that has transmitted the handover response (step S705).

If no handover response is received and timeout is reached (NO in step S701), another handover destination is searched for (step S703).

Next, example operation of an AP according to the present embodiment will be described with reference to FIG. 8.

Figure 8:
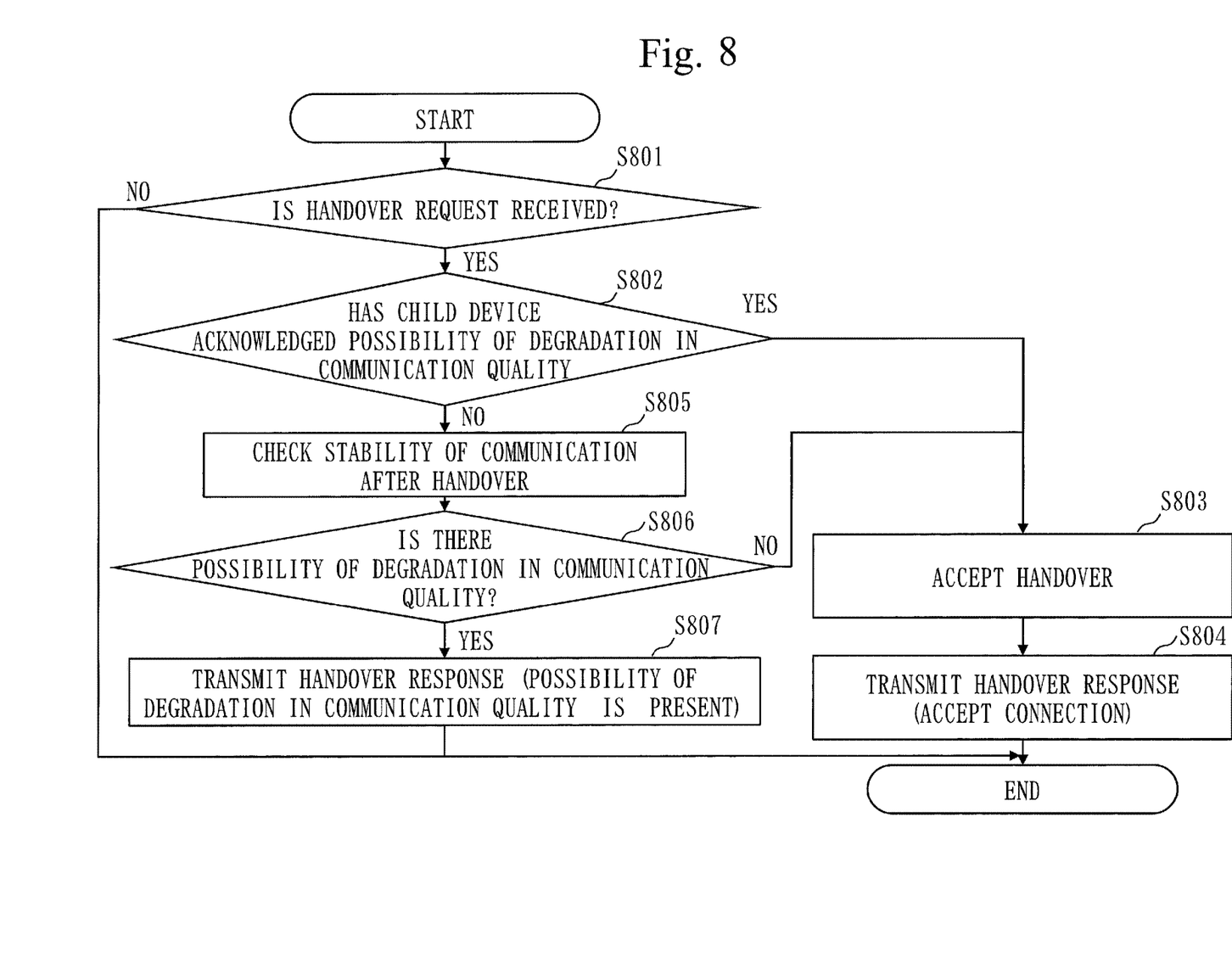
FIG. 8 is a flowchart illustrating example operation of the access point according to the first embodiment.

In FIG. 8, operation procedures of the AP after transmission of a handover request from the child device 21 (S406 in FIGS. 4 to 6) is illustrated.

Note that the operation procedures illustrated in FIG. 8 correspond to an example of the wireless relay method and the wireless relay program.

When the reception unit 2031 has received a handover request (YES in step S801), the reception unit 2031 outputs the received handover request to the control unit 2033.

The control unit 2033 checks whether or not the handover request indicates that the child device 21 has acknowledged the possibility of degradation in the communication quality during wireless communication (step S802).

If the handover request indicates that the child device 21 has acknowledged the possibility of degradation in the communication quality during wireless communication (YES in step S802), the control unit 2033 accepts handover of the child device 21 (step S803). The control unit 2033 then generates an acceptance indicating message, that is, a handover response accepting the handover, and the transmission unit 2032 transmits the handover response to the child device 21 (step S804).

In contrast, if the handover request does not indicate that the child device 21 has acknowledged the possibility of degradation in the communication quality during wireless communication (NO in step S802), the control unit 2033 checks the stability of communication with the child device 21 after handover (step S805). Specifically, the control unit 2033 determines whether or not an obstacle that affects the communication quality of wireless communication with the child device 21 moving along the moving route is present.

More specifically, the control unit 2033 acquires a captured image from the monitoring camera 301 via the monitoring camera IF unit 209, and also acquires a captured image in the steady state from the nonvolatile memory 208. The control unit 2033 then compares the captured image from the monitoring camera 301 with the captured image from the nonvolatile memory 208 to check whether or not an obstacle is present around the AP, that is, in the communication area of the AP. If an obstacle is present in the communication area of the AP, the control unit 2033 determines whether or not the communication quality of wireless communication with the child device 21 is affected by the obstacle, that is, whether or not the communication quality of wireless communication with the child device 21 is degraded by the obstacle on the basis of the current position and the moving route of the child device 21.

As a result of the determination in step S805, if the obstacle is present and the communication quality of wireless communication with the child device 21 may be degraded (YES in step S806), the control unit 2033 generates a handover response indicating the possibility of degradation in the communication quality during wireless communication, and the transmission unit 2032 transmits the handover response to the child device 21 (step S807).

In contrast, if the communication quality will not be degraded (NO in step S806), steps S803 and S804 described above are performed.

Description of Effects of Embodiment

As described above, in the present embodiment, the child device 21 informs the AP of the moving route by using the handover request. In addition, the AP checks whether or not an obstacle that degrades the communication quality of wireless communication with the child device 21 is present by using the captured image from the monitoring camera 301, and if the obstacle is present, informs the child device 21 of the possibility of degradation in the communication quality by using the handover response. Thus, according to the present embodiment, if the communication quality of wireless communication with an AP may be degraded, the child device 21 can search whether or not another AP to which handover can be performed is present.

In addition, if another AP to which handover can be performed is present as a result of the search, the child device 21 transmits a handover request to the other AP. This allows the child device 21 to perform wireless communication with the other AP with better communication quality.

Second Embodiment

In the first embodiment, an AP in receipt of a handover request from the child device 21 compares the captured image of the inside of the factory in the steady state stored in the nonvolatile memory 208 with the captured image from the monitoring camera 301 to determine whether or not an obstacle is present.

In the present embodiment, an AP causes an external device such as the center device to determine whether or not an obstacle is present so that the load on the AP is reduced.

In the following, differences from the first embodiment are mainly described. The matters that are not described below are the same as those in the first embodiment.

In the present embodiment, the external device is assumed to hold the captured image of the inside of the factory in the steady state.

In addition, the control unit 2033 transmits the captured image from the monitoring camera 301 to the external device through the external IF unit 211.

The external device compares the captured image from the monitoring camera 301 with the captured image in the steady state, and checks whether or not an obstacle is present around the AP, that is, in the communication area of the AP. If an obstacle is present in the communication area of the AP, the external device transmits coordinate values of the obstacle to the AP.

In the AP, the external IF unit 211 receives the coordinate values of the obstacle from the external device, and outputs the received coordinate values of the obstacle to the control unit 2033. The control unit 2033 determines whether or not the communication quality of wireless communication with the child device 21 is affected by the obstacle, that is, whether or not the communication quality of wireless communication with the child device 21 is degraded by the obstacle on the basis of the coordinate values of the obstacle and the current position and the moving route of the child device 21 indicated by the handover request.

If the communication quality is determined to be degraded by the obstacle, the control unit 2033 transmits a handover response indicating the possibility of degradation in the communication quality to the child device 21 similarly to the first embodiment.

Since subsequent operation is the same as that in the first embodiment, the description thereof will be omitted.

As described above, in the present embodiment, the control unit 2033 causes the external device to analyze the captured image obtained by capturing the surroundings of the AP to detect an obstacle around the AP. If an obstacle around the AP is detected by the external device, the control unit 2033 then determines whether or not the detected obstacle is an obstacle that affects the communication quality of wireless communication with the child device 21 moving along the moving route on the basis of the moving route of the child device 21 indicated by the handover request.

This reduces the load of the AP.

Third Embodiment

In the present embodiment, the control unit 2033 analyzes a moving status of an obstacle, and if the obstacle is moving, determines whether or not the obstacle is an obstacle that affects the communication quality of wireless communication on the basis of the moving status of the obstacle and the moving route of the child device 21.

In the following, differences from the first embodiment are mainly described. The matters that are not described below are the same as those in the first embodiment.

In the present embodiment, an AP is connected with a plurality of monitoring cameras 301.

In addition, when a handover request is received by the reception unit 2031, the control unit 2033 analyzes a plurality of captured images from the plurality of monitoring cameras 301 to determine whether or not an obstacle is present, and if the obstacle is present, also determines the moving status of the obstacle.

If the obstacle is not moving, the control unit 2033 determines whether or not the obstacle degrades the communication quality of wireless communication with the child device 21 by the same determination method as that in the first embodiment.

If the obstacle is moving, the control unit 2033 analyzes the current position, the moving speed, and the moving direction of the obstacle, for example, as the moving status of the obstacle. The control unit 2033 then determines whether or not the obstacle degrades the communication quality of wireless communication with the child device 21 on the basis of the analyzed current position, moving speed, and moving direction of the obstacle, the current potion and the moving route of the child device 21 indicated by the handover request, and a moving speed of the child device 21 that is a preset value. For example, the control unit 2033 determines whether the obstacle causes long-term degradation in the communication quality or the degradation in the communication quality caused by the obstacle is momentary.

If the communication quality is determined to be degraded for a long time by the obstacle, the control unit 2033 transmits a handover response indicating the possibility of degradation in the communication quality to the child device 21 similarly to the first embodiment.

Since subsequent operation is the same as that in the first embodiment, the description thereof will be omitted.

As described above, in the present embodiment, the control unit 2033 analyzes the captured images obtained by capturing the surroundings of the AP, and if a moving obstacle is detected as a result of the analysis of the captured images, determines whether or not the detected obstacle is an obstacle that affects the communication quality of wireless communication with the child device 21 moving along the moving route on the basis of the moving status of the obstacle and the moving route of the child device 21.

This allows the control unit 2033 to determine the influence of the obstacle on the communication quality with higher accuracy.

Fourth Embodiment

In the present embodiment, the control unit 2033 determines whether or not an obstacle is present without using the captured image from the monitoring camera 301.

In the following, differences from the first embodiment are mainly described. The matters that are not described below are the same as those in the first embodiment.

In the present embodiment, it is assumed that actual records of developments of the communication quality of past wireless communication with the child device are stored for each moving route in the nonvolatile memory 208 of an AP.

When a handover request is received by the reception unit 2031, the control unit 2033 reads the actual records of the developments of the communication quality associated with the moving route indicated by the handover request, from the nonvolatile memory 208. If the actual records show that the communication quality rapidly degraded in the past on the moving route, the control unit 2033 then determines that an obstacle that degrades the communication quality is present.

For example, if not less than a threshold of actual records show that the communication quality rapidly degraded within a time zone including the time at which the handover request is received, the control unit 2033 determines that an obstacle that degrades the communication quality is present.

If the communication quality is determined to be degraded by the obstacle, the control unit 2033 transmits a handover response indicating the possibility of degradation in the communication quality to the child device 21 similarly to the first embodiment.

Since subsequent operation is the same as that in the first embodiment, the description thereof will be omitted.

As described above, in the present embodiment, whether or not an obstacle that affects the communication quality of wireless communication with the child device 21 moving along a moving route is present is determined on the basis of the communication quality of past wireless communication with the child device moving along the moving route.

This allows the control unit 2033 to determine whether or not an obstacle that affects the communication quality of wireless communication is present without using video captured by the monitoring camera 301.

Fifth Embodiment

In the present embodiment, the control unit 2033 determines the possibility of degradation in the communication quality also in view of the size of an obstacle.

In the following, differences from the first embodiment are mainly described. The matters that are not described below are the same as those in the first embodiment.

In the present embodiment, when any obstacle is detected on the basis of the current position and the moving route of the child device 21 and the captured image from the monitoring camera 301 as described in the first embodiment, the control unit 2033 analyzes the size of the detected obstacle.

If the size of the detected obstacle is not smaller than a threshold, it is determined that the communication quality of wireless communication with the child device 21 may be degraded by the obstacle.

The control unit 2033 calculates the size of the obstacle from the captured image from the monitoring camera 301, for example.

If the communication quality is determined to be degraded by the obstacle, the control unit 2033 transmits a handover response indicating the possibility of degradation in the communication quality to the child device 21 similarly to the first embodiment.

Since subsequent operation is the same as that in the first embodiment, the description thereof will be omitted.

As described above, in the present embodiment, when any obstacle is detected on the basis of the moving route of the child device 21 and the captured image, the size of the detected obstacle is analyzed, and whether or not the detected obstacle is an obstacle that affects the communication quality of wireless communication with the child device 21 moving along the moving route is determined.

This allows the control unit 2033 to determine the possibility of degradation in the communication quality also in view of diffraction of electric waves.

Sixth Embodiment

In the present embodiment, the control unit 2033 determines the possibility of degradation in the communication quality also in view of the material of an obstacle.

In the following, differences from the first embodiment are mainly described. The matters that are not described below are the same as those in the first embodiment.

In the present embodiment, when any obstacle is detected on the basis of the current position and the moving route of the child device 21 and the captured image from the monitoring camera 301 as described in the first embodiment, the control unit 2033 analyzes the material of the detected obstacle.

If the material of the detected obstacle is not a material through which electric waves pass, it is determined that the communication quality of wireless communication with the child device 21 may be degraded by the obstacle.

The control unit 2033 receives information on the material of the obstacle from a sensor which identifies the material of an obstacle, for example.

If the communication quality is determined to be degraded by the obstacle, the control unit 2033 transmits a handover response indicating the possibility of degradation in the communication quality to the child device 21 similarly to the first embodiment.

Since subsequent operation is the same as that in the first embodiment, the description thereof will be omitted.

As described above, in the present embodiment, when any obstacle is detected on the basis of the moving route of the child device 21 and the captured image, the material of the detected obstacle is analyzed, and whether or not the detected obstacle is an obstacle that affects the communication quality of wireless communication with the child device 21 moving along the moving route is determined.

This allows the control unit 2033 to determine the possibility of degradation in the communication quality also in view of the characteristics of electric wave transmissibility of an obstacle.

Some embodiments of the present invention have been described above; two or more of the embodiments may be combined.

Alternatively, one of the embodiments may be partially carried out.

Alternatively, two or more of the embodiments may be partially combined.

Note that the present invention is not limited to the embodiments, but various modifications may be made thereto where necessary.

Description of Hardware Configuration

Finally, supplementary explanation of the hardware configurations of the child device 21 and the APs 11 to 14 will be provided.

While one processor is illustrated in FIGS. 2 and 3, the child device 21 and the APs 11 to 14 may each include a plurality of processors.

In addition, in the child device 21, information, data, signal values, and variable values representing results of processing performed by the reception unit 1031, the transmission unit 1032, and the search unit 1033 are stored in the storage device 105, or a register or a cache memory in the processor 103.

In addition, in the APs 11 to 14, information, data, signal values, and variable values representing results of processing performed by the reception unit 2031, the transmission unit 2032, and the control unit 2033 are stored in the storage device 205, or a register or a cache memory in the processor 203.

Furthermore, programs to realize the functions of the reception unit 1031, the transmission unit 1032, the search unit 1033, the reception unit 2031, the transmission unit 2032, and the control unit 2033 may be stored in a portable storage medium such as a magnetic disk, a flexible disk, an optical disk, a compact disk, a Blu-ray (registered trademark) disk, or a DVD.

In addition, the reception unit 1031, the transmission unit 1032, the search unit 1033, the reception unit 2031, the transmission unit 2032, and the control unit 2033 may be read as "circuits," "steps," "procedures," or "processes."

Furthermore, the child device 21 and the APs 11 to 14 may be realized by an electronic circuits such as a logic integrated circuit (IC), a gate array (GA), an application specific integrated circuit (ASIC), or a field-programmable gate array (FPGA).

In this case, the reception unit 1031, the transmission unit 1032, the search unit 1033, the reception unit 2031, the transmission unit 2032, and the control unit 2033 are each implemented as part of the electronic circuit.

Note that the processors and the electronic circuits may be collectively referred to as processing circuitry.

REFERENCE SIGNS LIST

11: AP, 12: AP, 13: AP, 14: AP, 21: child device, 31: obstacle, 41: moving route, 42: moving route, 51: point, 100: antenna, 101: PHY unit, 102: MAC unit, 103: processor, 105: storage device, 106: ROM, 107: RAM, 108: nonvolatile memory, 109: external IF unit, 200: antenna, 201: PHY unit, 202: MAC unit, 203: processor, 205: storage device, 206: ROM, 207: RAM, 208: nonvolatile memory, 209: monitoring camera IF unit, 211: external IF unit, 301: monitoring camera, 1031: reception unit, 1032: transmission unit, 1033: search unit, 2031: reception unit, 2032: transmission unit, 2033: control unit.

The invention claimed is:

1. A wireless relay device comprising:
   processing circuitry to:
   receive from a wireless communication device, a handover request requesting handover of wireless communication to the wireless relay device from a different wireless relay device, the handover request indicating a moving route of the wireless communication device;
   determine whether or not an obstacle that affects communication quality of wireless communication with the wireless communication device moving along the moving route is present on the basis of the moving route of the wireless communication device indicated by the handover request; and
   transmit to the wireless communication device, a handover response indicating possibility of degradation in communication quality during wireless communication between the wireless communication device moving along the moving route and the wireless relay device, when the obstacle affecting the communication quality of the wireless communication with the wireless communication device is determined to be present, wherein
   the processing circuitry causes an external device to analyze a captured image obtained by capturing surroundings of the wireless relay device to detect an obstacle around the wireless relay device, and when an obstacle is detected around the wireless relay device by the external device, the processing circuitry determines whether or not the detected obstacle is an obstacle affecting the communication quality of wireless communication with the wireless communication device moving along the moving route on the basis of the moving route of the wireless communication device indicated by the handover request.

2. The wireless relay device according to claim 1, wherein the processing circuitry may receive an acknowledgment indicating message indicating that the wireless communication device acknowledges the possibility of degradation in the communication quality during wireless communication between the wireless communication device and the wireless relay device, from the wireless communication device, after the handover response is transmitted to the wireless communication device,
   when the acknowledgment indicating message is received, the processing circuitry accepts a handover request from the wireless communication device, and
   the processing circuitry transmits to the wireless communication device, an acceptance indicating message indicating that the handover request is accepted.

3. The wireless relay device according to claim 1, wherein the processing circuitry determines whether or not an obstacle affecting the communication quality of wireless communication with the wireless communication device moving along the moving route is present, on the basis of the moving route of the wireless communication device indicated by the handover request and a captured image obtained by capturing the surroundings of the wireless relay device.

4. The wireless relay device according to claim 3, wherein the processing circuitry analyzes the captured image obtained by capturing the surroundings of the wireless relay device, and when a moving obstacle is detected as a result of analysis of the captured image, determines whether or not the detected obstacle is an obstacle affecting the communication quality of wireless communication with the wireless communication device moving along the moving route, on the basis of a moving status of the obstacle and the moving route of the wireless communication device.

5. The wireless relay device according to claim 3, wherein when any obstacle is detected on the basis of the moving route of the wireless communication device and the captured image, the processing circuitry analyzes at least either one of a size and a material of the detected obstacle, to determine whether or not the detected obstacle is an obstacle affecting the communication quality of wireless communication with the wireless communication device moving along the moving route.

6. The wireless relay device according to claim 1, wherein the processing circuitry determines whether or not an obstacle affecting the communication quality of wireless communication with the wireless communication device moving along the moving route is present, on the basis of communication quality of wireless communication with a wireless communication device having been moving along the moving route in the past.

7. A method executed by a wireless relay device comprising:
   receiving from a wireless communication device, a handover request requesting handover of wireless communication to the wireless relay device from a different wireless relay device, the handover request indicating a moving route of the wireless communication device;
   determining whether or not an obstacle that affects communication quality of wireless communication with the wireless communication device moving along the moving route is present on the basis of the moving route of the wireless communication device indicated by the handover request; and
   transmitting to the wireless communication device, a handover response indicating possibility of degradation in communication quality during wireless communication with the wireless communication device moving along the moving route, when the obstacle affecting the communication quality of the wireless communication with the wireless communication device is determined to be present, wherein the determining step causes an external device to analyze a captured image obtained by capturing surroundings of the wireless relay device to detect an obstacle around the wireless relay device, and when an obstacle is detected around the wireless relay device by the external device, the determining step determines whether or not the detected obstacle is an obstacle affecting the communication quality of wireless communication with the wireless communication device moving along the moving route on the basis of the moving route of the wireless communication device indicated by the handover request.

8. A non-transitory computer readable medium storing a program executed by a wireless relay device causing the wireless relay device to execute:

a reception process of receiving from a wireless communication device, a handover request requesting handover of wireless communication to the wireless relay device from a different wireless relay device, the handover request indicating a moving route of the wireless communication device;

a control process of determining whether or not an obstacle that affects communication quality of wireless communication with the wireless communication device moving along the moving route is present on the basis of the moving route of the wireless communication device indicated by the handover request; and a transmission process of transmitting to the wireless communication device, a handover response indicating possibility of degradation in communication quality during wireless communication between the wireless communication device moving along the moving route and the wireless relay device, when the obstacle affecting the communication quality of the wireless communication with the wireless communication device is determined to be present in the control process, wherein the control process causes an external device to analyze a captured image obtained by capturing surroundings of the wireless relay device to detect an obstacle around the wireless relay device, and when an obstacle is detected around the wireless relay device by the external device, the control process determines whether or not the detected obstacle is an obstacle affecting the communication quality of wireless communication with the wireless communication device moving along the moving route on the basis of the moving route of the wireless communication device indicated by the handover request.

* * * * *